United States Patent [19]
Arend

[11] Patent Number: 4,708,625
[45] Date of Patent: Nov. 24, 1987

[54] MOLD CLOSING APPARATUS
[75] Inventor: Donald P. Arend, Ada, Mich.
[73] Assignee: C & F Stamping Co., Inc., Grand Rapids, Mich.
[21] Appl. No.: 850,753
[22] Filed: Apr. 11, 1986
[51] Int. Cl.[4] ............................................. B29C 45/64
[52] U.S. Cl. ..................................... 425/589; 100/231; 100/295; 264/328.6; 264/DIG. 83; 425/411; 425/450.1; 425/451; 425/451.9; 425/453
[58] Field of Search ............ 425/156, 214, 411, 450.1, 425/451, 451.9, 453, 519, 540, 541, 589, 543, 817 R, 595; 264/DIG. 83, 328.6; 100/53, 231, 295

[56] References Cited
U.S. PATENT DOCUMENTS

| Re. 30,130 | 10/1979 | Edwards | 425/453 |
|---|---|---|---|
| 3,126,594 | 3/1964 | Galloway | 164/264 |
| 3,309,739 | 3/1967 | Trueblood | 425/151 |
| 3,717,430 | 2/1973 | Hansen | 425/156 |
| 3,734,671 | 5/1973 | Talasz | 425/541 |
| 3,880,560 | 4/1975 | Takahashi | 425/130 |
| 3,914,081 | 10/1975 | Aoki | 425/130 |
| 3,981,671 | 9/1976 | Edwards | 425/453 |
| 4,007,679 | 2/1977 | Edwards | 100/53 |
| 4,015,920 | 4/1977 | Niederst et al. | 425/451.9 |
| 4,082,492 | 4/1978 | Kurreck | 425/451 |
| 4,083,671 | 4/1978 | Niederst et al. | 425/450.1 |
| 4,172,872 | 10/1979 | Nagai | 264/519 |
| 4,191,523 | 3/1980 | Neiderst et al. | 425/589 |
| 4,212,614 | 7/1980 | Holzinger | 425/214 |
| 4,318,682 | 3/1982 | Larson et al. | 425/411 |
| 4,421,472 | 12/1983 | Martin, Jr. | 425/527 |

OTHER PUBLICATIONS
Cincinnati Milacron RIMM-125 Reaction Injection Molding Machine.
Ex-Cell-O/Plastics Machinery Systems 50-75 Ton RIM press.

Primary Examiner—Jay H. Woo
Assistant Examiner—Timothy W. Heitbrink
Attorney, Agent, or Firm—Price, Heneveld, Cooper, DeWitt & Litton

[57] ABSTRACT

A mold closing assembly having two platen supporting bodies or turrets mounted on a base to pivot in a generally horizontal plane about two vertical pivot axes. At least one platen reciprocates linearly to clamp the mold sections together, and a tie bar extends above the two turrets between the pivot points. Preferably the mold closing assembly has a modular construction.

28 Claims, 11 Drawing Figures

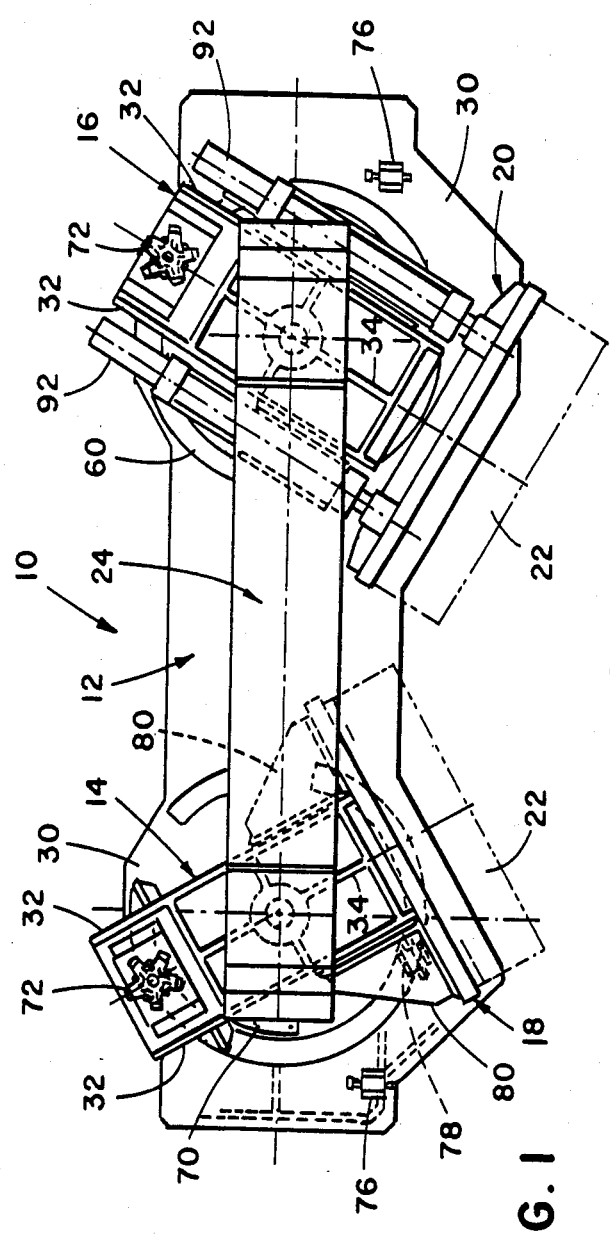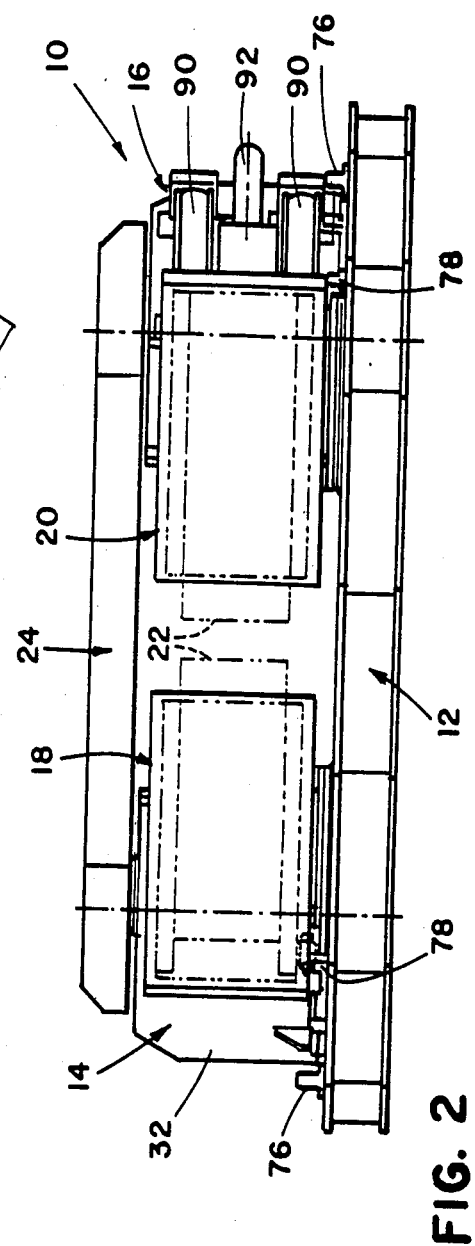

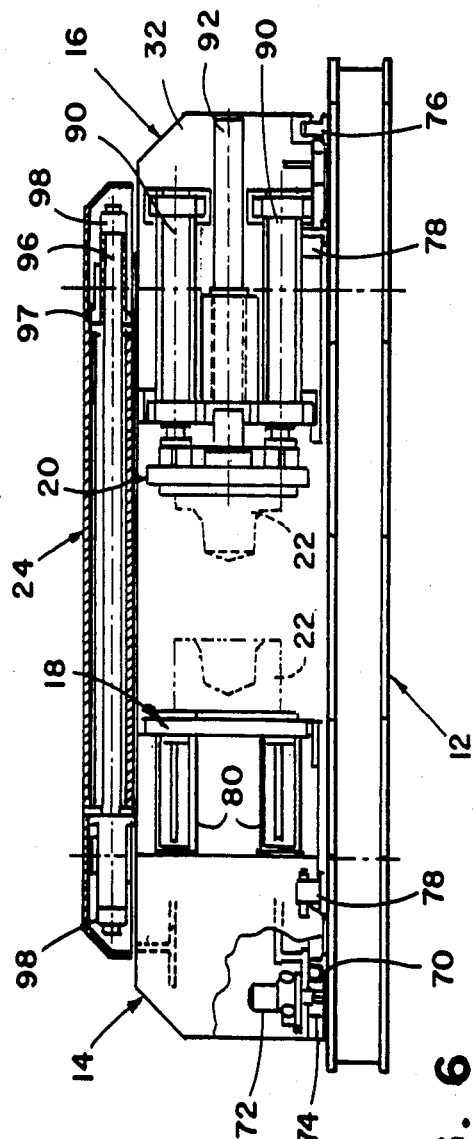

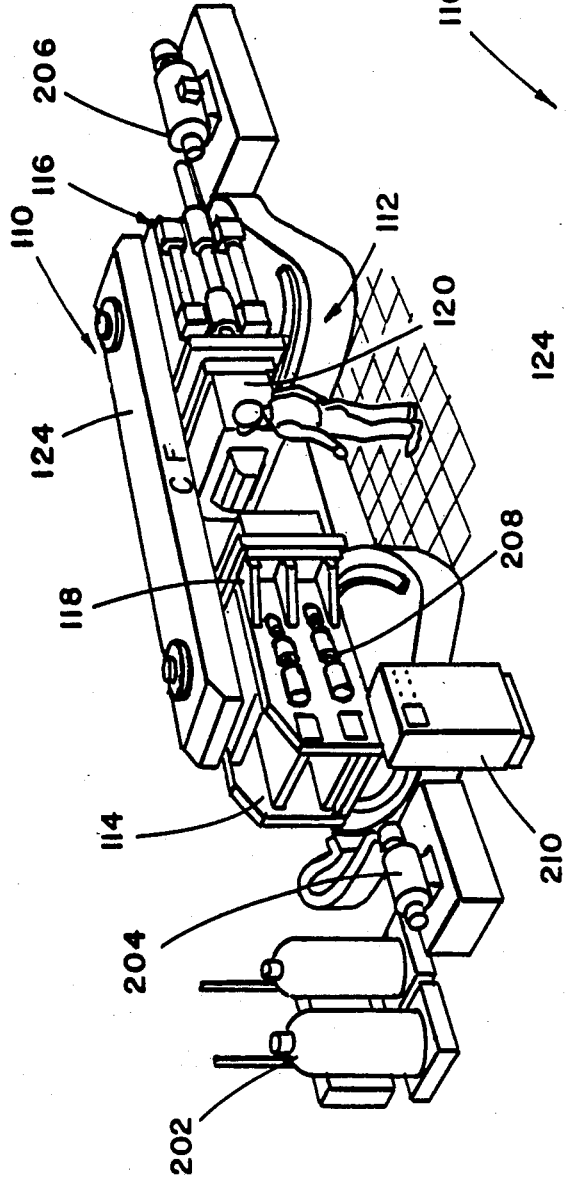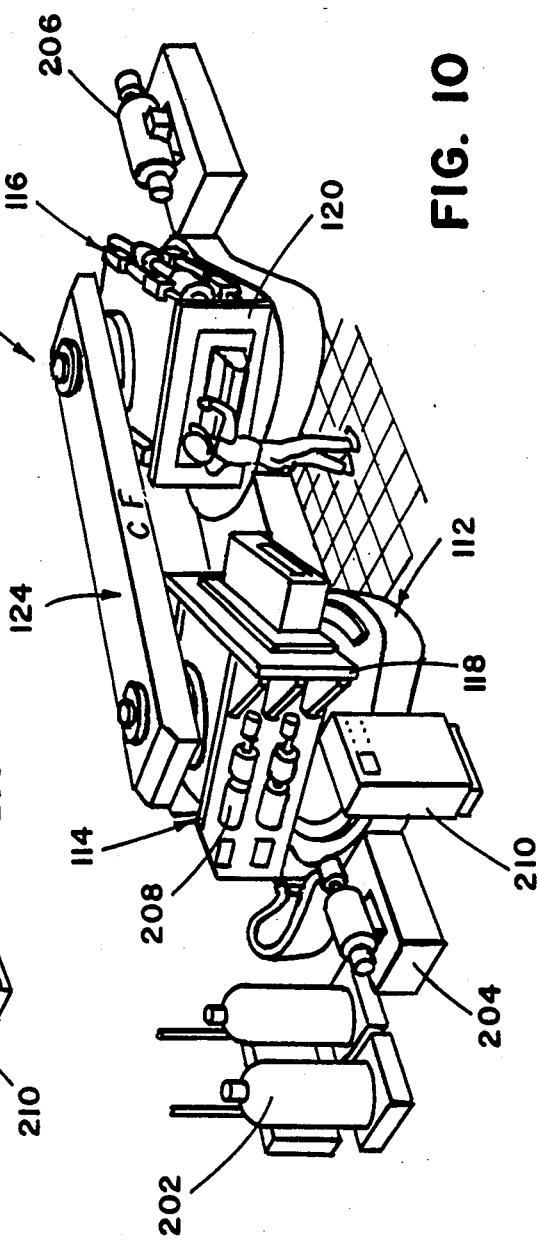

MOLD CLOSING APPARATUS

BACKGROUND OF THE INVENTION

The present invention relates to apparatus for opening and closing mold sections, and in particular to injection molding presses.

Liquid reaction molding or reaction injection molding (R.I.M.) is used in the formation of a wide variety of products. Such molding techniques utilize a molding press that opens and closes the mating mold sections and maintains a substantial closing pressure during the molding process. Typically these molding presses include a vertical C-shaped frame that is seated on a support bed. A pair of opposed platens are mounted on the upper and lower horizontal legs of the frame and the mating mold sections are mounted on these platens to be vertically aligned or stacked when closed. To close the mold sections the platens are first oriented with the mold mounting faces generally parallel to each other and then one or both of the platens are advanced toward the other.

In order to provide access to the inside of the mold after the platens have separated, one or both of the platens are pivoted (referred to as booking) in order to swing the mold sections to the side of the frame. Since the two platens are aligned vertically, the platen or platens pivot in a single vertical plane about two spaced horizontal axes. In presses that book a single platen, typically the upper platen is booked outwardly while the lower platen remains stationary forming an upwardly facing platform.

Heretofore, due to the vertical arrangement of the platens on such R.I.M presses an operator has been required to reach or stand under the upper platen and mold section to remove the molded part or otherwise service either platen. With mold closing presses having a stationary lower platen, the operator is required to reach into the path of travel of the closing mold in order to access the lower mold section. This overhanging arrangement presents a potential safety hazard to the operator, as well as presenting difficulties in accessing both mold sections. Since the platens are vertically spaced, when open both mold sections cannot be readily accessible to the operator unless the mold closing press is relatively small. If the lower platen is located at a convenient waist height for the operator, the upper platen necessarily must be raised to a height dictated by the maximum mold section size, and will be located overhead.

Further, the vertical arrangement of the platens and mold closing apparatus limit the maximum weight of the molds serviceable by such presses. Since the vertical framework must support the upper mold section, the platen and the pivoting apparatus all raised above the lower platen, the maximum mold weight that such machine can handle is limited. This is particularly true since the C-shaped frame supports the mold section, platen and pivoting apparatus in a cantilever fashion on the overhanging section of the frame. Typically, such mold presses cannot handle mold sections that weigh in excess of about fifteen tons per mold section.

Although mold closing apparatus of different types having platens that pivot about vertical axes have been used for relatively small molding applications, these mold closing devices are substantially different from injection molding presses that provide linearly converging platens which generate very large closing pressures. These prior mold closing apparatus require that an operator reach into the platen's pivotal closing path of travel in order to access the mold sections.

SUMMARY OF THE INVENTION

The present invention is embodied in a mold closing apparatus having two platen supporting bodies which reciprocate at least one platen linearly in order to close the mold sections. At least one of the platen supporting bodies pivots in a horizontal plane about a generally vertical axis for booking the platen outwardly to the side of molding apparatus. Preferably, the two platen supporting bodies are modular units that are supported on a base with a tie bar extending above the platen support bodies and between the vertical axes of the platen supporting bodies. In a preferred embodiment of the invention each of the support bodies pivot about a generally vertical axis.

With the disclosed mold closing apparatus, the mold is booked about vertical axes so that the mold sections remain in the same general horizontal plane whether opened or closed. An operator may therefore readily access both mold sections when the mold is opened. Further, since the mold sections open in a horizontal plane the operator is not required to reach beneath an overhanging platen or other equipment in order to access the inside of the mold cavity. Additionally, each platen supporting body is supported by its own section of the base or bed, rather than being stacked vertically on top of the same section of bed. Since the bed directly supports both platen supporting bodies, much larger and heavier mold sections can be handled by the mold closing apparatus. Due to the horizontal arrangement of the platens, the apparatus may be operated in an area having much lower overhead clearance, and venting systems may be provided directly over each open mold section. Although the assembled apparatus is relatively large, the modular construction permits the apparatus to be transported and assembled in a relatively compact area.

These and other objects, features and benefits of the invention will be recognized from the specification and claims which follow and the drawings appended hereto.

BRIEF DESCRIPTION OF THE DRAWINGS

FIG. 1 is a top plan view of a mold closing apparatus embodying the present invention, shown in the opened booked condition;

FIG. 2 is a front elevational view of the mold closing apparatus of FIG. 1;

FIG. 6 is a fragmentary front elevational view of the mold closing apparatus of FIG. 5 with the upper tie bar shown in cross section and taken along section line VI—VI of FIG. 5;

FIG. 7 is a left end elevational view of the mold closing apparatus shown in FIG. 5;

FIG. 8 is a cross sectional view taken along section line VIII—VIII of FIG. 5;

FIG. 9 is a perspective view of a mold closing apparatus forming a second preferred embodiment of the invention, shown in an aligned position for closing or clamping;

FIG. 10 is a perspective view of the mold closing apparatus of FIG. 9, shown in the opened booked position.

DESCRIPTION OF THE PREFERRED EMBODIMENTS

Figure 4:
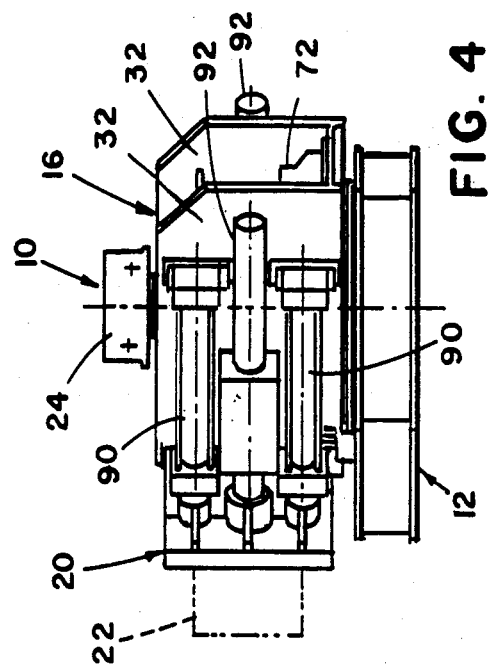
FIG. 4 is a right end elevational view of the mold closing apparatus of FIG. 1.
Figure 3:
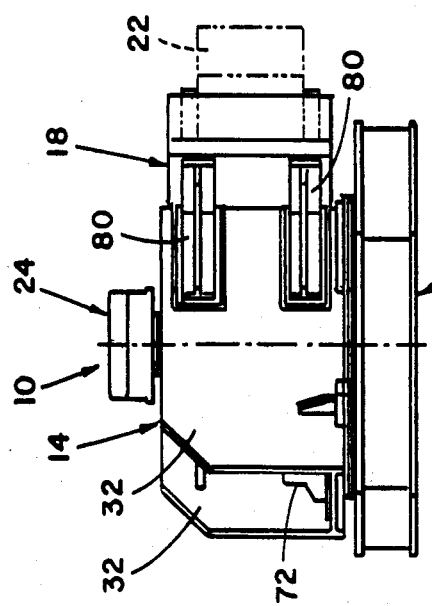
FIG. 3 is a left end elevational view of the mold closing apparatus of FIG. 1.

The present invention is embodied in a mold closing apparatus, one preferred form of which is shown in FIG. 1 and referenced generally by the numeral 10. Apparatus 10 includes a base or bed 12 on which two turret assemblies 14 and 16 are pivotally mounted. Each turret 14, 16 supports a platen 18 and 20, respectively. A mold section 22 is removably mounted on the outer face of each platen 18 and 20. Turrets 14 and 16 pivot generally horizontally in order to book mold sections 22 to the side of apparatus 10 while maintaining mold sections 22 in the same general horizontal plane. A tie bar 24 extends above turrets 14 and 16 and couples the axels of turrets 14 and 16 together.

Bed 12 is a flat metal platform having two widened turret mounting regions 30 adjacent each end. Each widened turret mounting region 30 supports a single one of pivoting turrets 14, 16. Due to the large area covered by bed 12 in proportion to the amount of weight supported on any given region, bed 12 does not necessarily require a specially reinforced foundation beyond that provided in conventional light industry commercial facilities.

As shown in FIGS. 1 through 8, turrets 14 and 16 provide pivotal bodies for supporting platens 18 and 20. In addition to pivoting, turret 16 reciprocates platen 20 linearly toward (20' in FIG. 5) and away from platen 18 in order to close and clamp the mounting mold sections 22. Each turret has a pair of spaced sidewalls 32 connected by an interconnecting framework 34. As best shown in FIG. 8, both turrets 14 and 16 are pivotally mounted on base 12 by a mounting post 40. A cylindrical socket or sleeve 42 is set in base 12 at each turret mounting region 30. The reduced diameter lower end of post 40 is slid into mounting sleeve 40 and is rigidly supported therein. Each turret includes an upper mounting sleeve 44 and a lower mounting sleeve 46 which are vertically spaced and axially aligned and supported between sidewalls 32 by framework 34. Turret assemblies 14 and 16 are slid down over mounting posts 40 and a pair of brass sleeve bearings 48 provide a bearing surface for turrets 14, 16 to pivot about each mounting post 40. Tie bar 24 is fitted over the tops of mounting posts 40 and a securing disc 50 is bolted to tie bar 24 over the upper edge of post 40.

An interrupted circular metal annular plate 60 is secured to the upper surface of base 12 at each turret mounting region 30. Each annular plate 60 is broken into two sections to form the majority of the circumference of a circle and provide an annular bearing surface on which turrets 14, 16 pivotally slide. Annular plates 60 underlay the front and rear area of travel of turrets 14, 16 as the turrets swing both forwardly and rearwardly through the full booking area. Turrets 14, 16 have a planar lower surface to which brass or bronze bearing plates (not shown) are secured which slide along annular bearing plates 60 which are greased to reduce friction. Alternatively, a set of roller bearings can be mounted on the undersurface of each turret 14, 16 in order to roll along and support turrets 14, 16 on the upper surface of base 12 or bearing plates 60. As another alternative, turrets 14 and 16 can be mounted on circular bearing races.

A curved rack 70 (FIGS. 1, 5 and 6) is secured to the upper surface of base 12 at each end and is located slightly radially inward of bearing plate 60. Each rack 70 extends roughly one-fourth circle circumscribed by the path traveled by the rear end of turret 14, 16 as the turret is booked. A hydraulic turret drive motor 72 is mounted on a plate at the rear of each turret 14 and 16. Each removable drive motor 72 has a shaft to which a pinion gear 74 (FIGS. 6-7) is mounted and which meshes with a complementary rack 70 in order to provide two drive units that can independently or jointly pivot or book turrets 14 and 16 in either direction.

Figure 5:
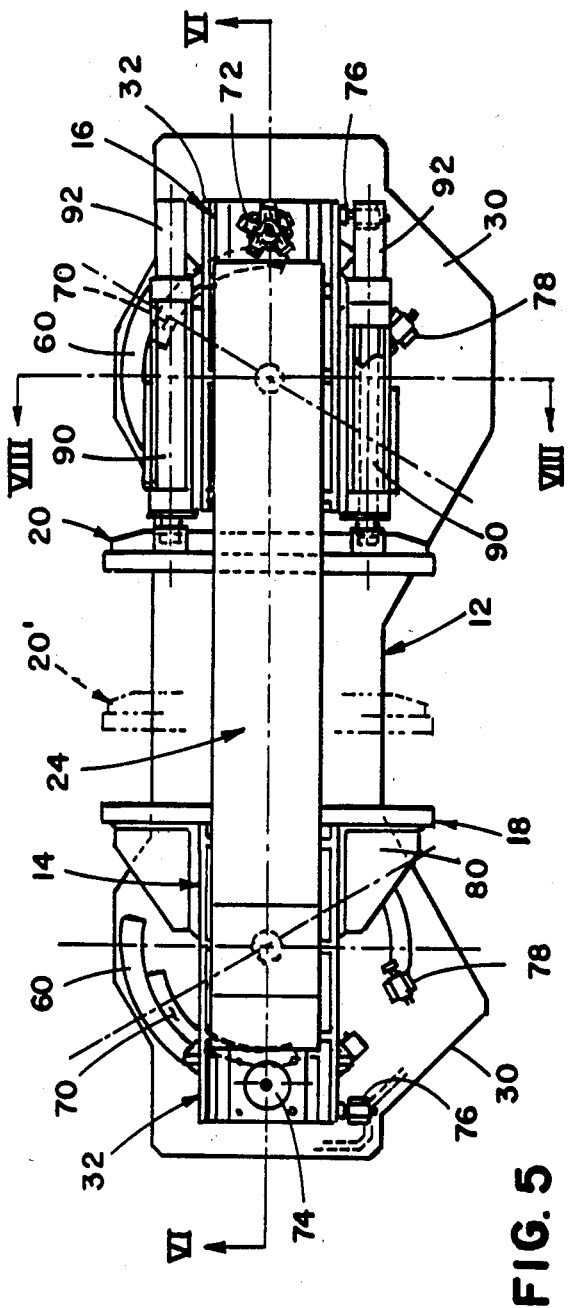
FIG. 5 is a top plan view of the mold closing apparatus of FIG. 1, shown in the aligned position for closing or clamping.

Two sets of fixed position stops 76 and 78 each with an associated limit switch are positioned to detect the stop points of turrets 14 and 16. As shown in FIG. 5, fixed stops 76 contact sidewalls 32 when platens 18 and 20 are in an aligned position for closing. As shown in FIGS. 1 and 2, fixed stops 78 contact sidewalls 32 when platens 18 and 20 are in an unaligned or booked position. When turrets 14, 16 have been pivoted to an aligned position and engage fixed stops 76, drive motors 72 maintain the position of turrets 14, 16 in order to permit the closing of platens 18, 20. Alternatively, when turrets 14, 16 contact fixed stops 76, a lock pin may be automatically or manually slid between the turret and base 12 in order to maintain the proper alignment of platens 18 and 20 during closing.

Platen 18 is mounted on turret 14 by four wedge-shaped braces 80 (FIGS. 1 and 3) that are secured to sidewalls 32. Sidewalls 32 on turret 14 provide a large unobstructed region on which a conventional injection molding assembly may be mounted in order to inject molding material into mold sections 22. Alternatively, a manifold of injection lines may extend back along sidewalls 32 of turret 14 to be operably coupled to a floor mounted conventional injection assembly.

Platen 20 is reciprocally mounted on sidewalls 32 of turret 16 by four hydraulic clamping cylinders 90. Hydraulic cylinders 90 reciprocate platen 20 linearly in order to advance platen 20 toward platen 18 when turrets 14 and 16 are in an aligned position (FIG. 5). Hydraulic cylinders 90 most preferably are each a twelve inch cylinder equivalent and collectively generate a five hundred sixty-five tons at twenty-five hundred pounds per square inch clamping pressure. Cylinders 90 preferably have a forty-eight inch stroke and are operably connected to two hydraulic motors, one of which provides a low pressure high volume initial approach for the rapid advancement of platen 20. The other hydraulic pump motor provides a low volume but high pressure approach that applies the final clamping pressure between platens 20 and 18 at twenty-five hundred p.s.i. Apparatus 10 preferably provides a daylight dimension of seventy-seven inches between platens 18 and 20 when in the open but aligned position.

A pair of guide rods 92 are slidably received through appropriate sleeve bearings mounted on sidewalls 32 of turret 16. Guide rods 92 are connected to platen 20 to assist in mounting platen 20 on turret 16 and maintain the proper alignment between platen 20 and platen 18 during closing. Alternatively, platen 20 may also have a plurality of guide pins extending forward from its forward face to be received in apertures on platen 18.

Tie bar 24 provides a rectangular housing around two parallel tie rods 96 (FIGS. 6, 8). Tie rods 96 extend through horizontal extending sockets in a tie bar coupling 97 (FIG. 6) within tie bar 24 at each end adjacent mounting posts 40. Tie bar couplings 97 each include two sockets or channels for recovering the tie rods 96 that extend on either side of a vertical channel forward through the floor of coupling 97 and through which mounting post 40 is received. Tie bar adjustment nuts 98 (FIG. 6) are threaded on the threaded ends of tie rods 96 in order to adjust the coupling between turret 16 and 18.

Mold closing apparatus 10 is made in a modular assembly in order to permit easy transportation and assembly. Base 12 is formed in two sections at turret mounting regions 30 which are bolted together. Posts 40 are slid into mounting sleeves 42 and turrets 14 and 16 are slid down over the top of posts 40. Tie bar 24 has a two section modular construction that is bolted together, with tie rods 96 also holding the two sections of tie bar 24 together. Tie bar 24 is fitted down over the top of mounting posts 40, and tie rods 96 are adjusted in order to rigidly maintain the spacing of mounting posts 40.

Mold closing apparatus 10 in one embodiment is approximately eight feet high and ten feet wide at the widest point of turret mounting regions 30. Bed 12 is approximately twenty-five feet long. Mold closing apparatus 10 may be a relatively large size and most preferably accommodate platens up to fifty inches by one hundred ten inches. The large size of mold closing apparatus 10 provides seventy-seven inches of daylight and yet requires only approximately two seconds to book.

Mold closing apparatus 10 can be used to handle mold sections 22 that weigh up to thirty tons in each mold section. When used with relatively heavy mold sections, mold closing apparatus 10 may alternatively be equipped with support blocks or shoes that are clamped underneath either the platen or mold section 22 itself. These shoes would slide along a circular bearing plate on base 12 spaced radially outward of bearing plate 60. An additional alternative bearing plate would extend linearly along the upper surface of bed 12 between platens 18 and 20 so that the shoe on platen 20 would slide along the bearing plate as platen 20 is advanced linearly.

Figure 11:
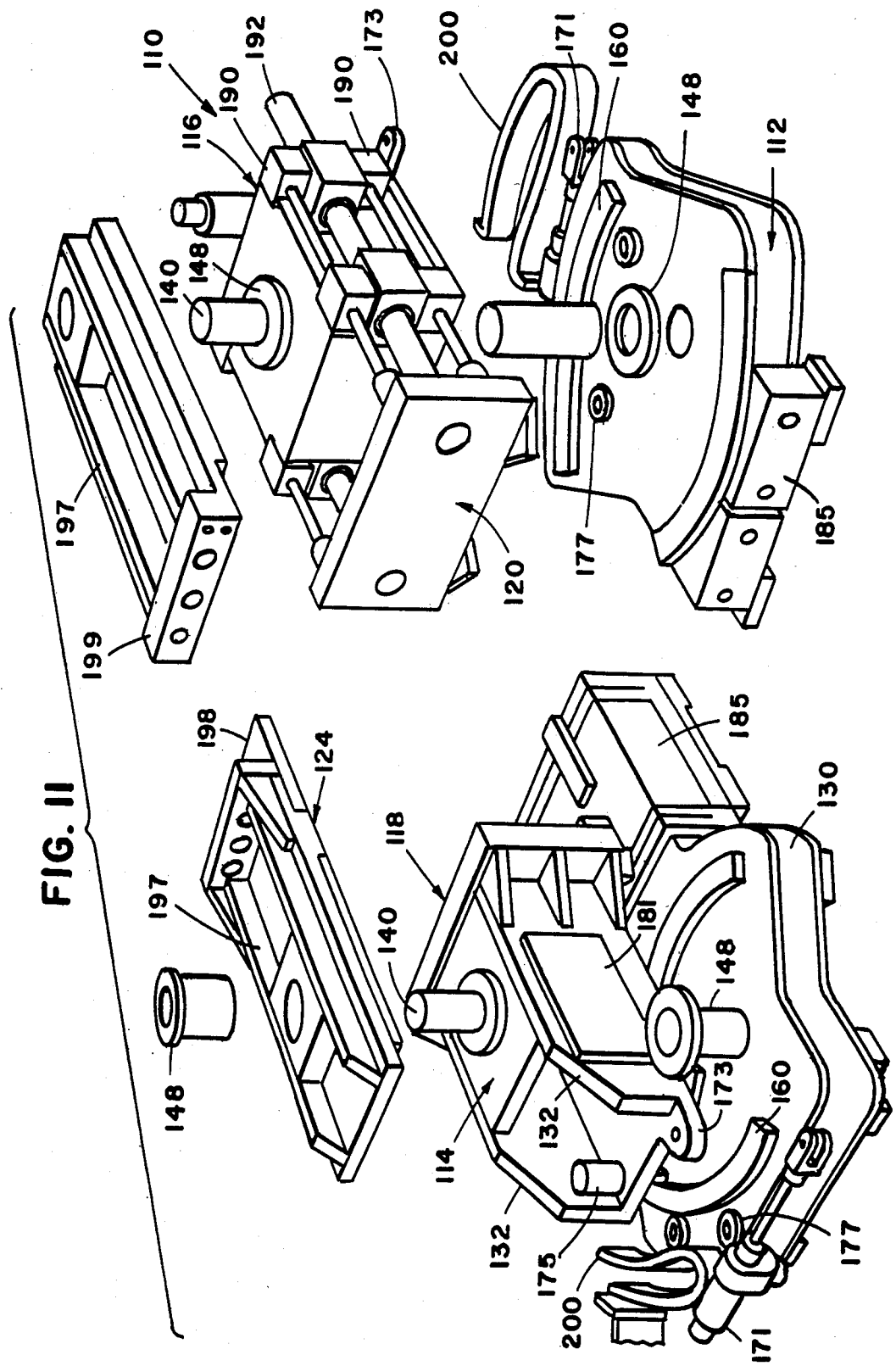
FIG. 11 is an exploded, perspective view of the mold closing apparatus of FIGS. 1-9.

An alternative preferred embodiment is shown in FIGS. 9, 10 and 11 and referenced generally by the numeral 110. Mold closing apparatus 110 is generally similar to mold closing apparatus 10 described above, with the exception of the differences noted below. Similar elements have therefore been labeled with similar reference numerals with the addition of the prefix one hundred.

Mold closing apparatus 110 includes a bed 112 on which a laterally spaced pair of turrets 114 and 116 are pivotally mounted. Turret 114 carries a platen 118 and turret 116 mounts a platen 120. Mold sections 122 are mounted on plates 118 and 120, and a tie bar 124 couples turrets 114 and 116. Turrets 114 and 116 are pivoted or booked by a pair of hydraulic booking cylinders 171 (FIG. 11). Hydraulic booking cylinders 171 are pivotally mounted to base 112 and are pivotally coupled to a flange 173 on the rear of each turret 114 and 116. A lock pin 175 is mounted on the rear of each turret assembly and is selectively received in spaced locking apertures 177 in base 112. Lock pins 175 maintain turrets 114 and 116 in the appropriate aligned or unaligned position.

On one outer sidewall 132 of turret 114 is a mounting pad 181 on which a conventional molding injection assembly is mounted.

Base 112 is manufactured in a modular construction. Two mating base sections 185 telescopingly mate between turret mounting regions 130 and are bolted together to form a rigid connection. Tie bar 124 also has a two piece modular construction. Tie bar 124 includes two tie bar sections 197. One tie bar section 197 has a protruding lower flange 198 and the other tie bar section 197 includes a protruding upper connecting flange 199. Protruding connecting flanges 198 and 199 are overlapped and are bolted together to form a rigid assembly.

As shown in FIG. 11, curved loops of hose 200 supply fluid to the mold injection assembly and to hydraulic clamping cylinders 190.

Shown in FIGS. 9 and 10, the injection molding system and assembly includes a conventional recirculation system 202 and a power unit 204 for the injection assembly. A separate power unit 206 is provided for the booking assembly. An injection and mixing head assembly 208 is mounted on the side of turret 114 and a control unit 210 can be operably connected to the various assemblies in a conventional manner.

It is to be understood that the above is a description of the preferred embodiment and various modifications and improvements may be made without departing from the spirit of the invention disclosed herein. The scope of protection afforded is to be determined by the claims which follow and the breadth of interpretation which the law allows.

The embodiments of the invention in which an exclusive property or privilege is claimed are as follows:

1. A mold closing assembly for supporting and selectively closing two mold sections, comprising:
   a base;
   a first platen support body mounted on said base and having a first platen thereon;
   a second platen support body mounted on said base and having a second platen thereon;
   at least one of said platen support bodies having a vertical pivot axis, said one platen support body mounted to selectively pivot relative to said base about said vertical pivot axis between an aligned position in which said platens are aligned for closing and an unaligned position in which said platens are pivotally unaligned for access;
   means for selectively linearly advancing and retracting one of said platens toward the other of said platens when said one platen support body is in said aligned position; and
   means for selectively pivoting said one platen support body between said aligned position and said unaligned position in a generally horizontal plane.

2. The mold closing assembly of claim 1, wherein:
   said platen support bodies each have a vertical pivot axis and each said platen support body pivots relative said base about said vertical axis thereof, whereby both platen support bodies pivot in a generally horizontal plane.

3. The mold closing assembly of claim 2, wherein:
   said pivoting means simultaneously pivots both said platen support bodies.

4. The mold closing assembly of claim 2, wherein:
   said pivoting means selectively pivots both said platen support bodies independently.

5. The mold closing assembly of claim 2, further comprising:
a tie bar extending above said platen support bodies and between said vertical axes, said tie bar coupling said platen support bodies.

6. The mold closing assembly of claim 5, wherein:
each said platen support body comprises a modular unit mounted on said base.

7. The mold closing assembly of claim 6, further comprising:
said tie bar comprising two modular tie bar sections having means for securing said tie bar sections together 8. The mold closing assembly of claim 7, further comprising:
two vertical mounting posts mounted on said base; and
said platen support bodies each having a post channel therein at said vertical pivot axis, said mounting posts received in said post channels.

9. The mold closing assembly of claim 8, wherein:
said pivoting means includes one of said base and said one platen support body having a curved rack thereon, and the other of said base and said one platen support body having a pinion mounted thereon meshing with said rack, said pinion operably connected to a drive motor.

10. The mold closing assembly of claim 1, further comprising:
a tie bar extending above said platen support bodies, said tie bar coupling said platen support bodies.

11. The mold closing assembly of claim 10, wherein:
both said platen support bodies have a vertical pivot axis, said tie bar extending between said vertical axes.

12. The mold closing assembly of claim 1, wherein:
each said platen support body comprises a modular unit mounted on said base.

13. The mold closing assembly of claim 12, further comprising:
a tie bar extending above said platen support bodies, said tie bar coupling said platen support bodies, and said tie bar comprising two modular tie bar sections.

14. The mold closing assembly of claim 12, further comprising:
two vertical mounting posts mounted on said base; and
said platen support bodies each having a post channel therein, said mounting posts received in said post channels.

15. The mold closing assembly of claim 1, wherein:
said base has an upper surface, and said platen support bodies are pivotally slidably supported on said base upper surface.

16. The mold closing assembly of claim 1, wherein:
said pivoting means includes one of said base and said one platen support body having a curved rack thereon, and the other of said base and said one platen support body having a pinion mounted thereon meshing with said rack, said pinion operably connected to a drive motor.

17. The mold closing assembly of claim 1, wherein:
said mold closing assembly has a front and a back;
said one platen is pivoted toward said front of said mold closing assembly to said unaligned position;
whereby access to said platens is substantially unobstructed from both said front and said back of said mold closing assembly.

18. The mold closing assembly of claim 1, further comprising:
a molding material injection assembly mounted on one of said platen support bodies.

19. A mold closing assembly for supporting and selectively closing two mold sections, comprising:
a support bed;
two platen support bodies laterally spaced and mounted on said bed, each said platen support body having a platen thereon;
means for linearly reciprocating one of said platens with respect to the other of said platens;
means for horizontally pivoting at least one of said platen support bodies; and
a tie bar extending above said platen support bodies and coupling said platen support bodies above said platens.

20. The mold closing assembly of claim 19 wherein:
said pivoting platen support body pivots about a vertical pivot axis; and
said tie bar extends above said vertical pivot axis.

21. The mold closing assembly of claim 18, wherein:
said platen support bodies each pivot about a vertical pivot axis; and
said tie bar extends between said vertical pivot axes.

22. The mold closing assembly of claim 21, wherein:
said tie bar comprises two tie rods having adjustment nuts thereon.

23. The mold closing assembly of claim 21, wherein:
said tie bar comprises two modular tie bar sections having means for securing said tie bar sections together.

24. The mold closing assembly of claim 19, wherein:
each said platen support body comprises a modular unit mounted on said bed.

25. The mold closing assembly of claim 24, further comprising:
two vertical mounting posts telescopingly received in a pair of mounting sockets on said bed; and
said platen support bodies each having a post channel therein, said mounting post received in said post channels and said platen support bodies pivoting about said mounting posts.

26. The mold closing assembly of claim 19, wherein:
said mold closing assembly has a front and a back;
said one platen is pivoted toward said front of said mold closing assembly to said unaligned position;
whereby access to said platen is substantially unobstructed from both said front and said back of said mold closing assembly.

27. The mold closing assembly of claim 19, further comprising:
a molding material injection assembly mounted on one of said platen support bodies.

28. The mold closing assembly for supporting and selectively closing two mold sections, comprising:
a support base having two laterally spaced turret supporting regions thereon;
two platen supporting turrets pivotally mounted on said support base at said turret mounting regions, each said turret having a platen thereon;
at least one of said turrets having a platen advancement cylinder thereon, said platen advancement cylinder operably coupled to one of said platens for the linear reciprocation thereof, and a guide rod slidably coupling said one platen with said one turret;
a pivot post received through each of said turrets, said pivot posts secured to said support base, and said turrets each having means for pivoting said turret about said pivot post; and
a tie bar extending above said turrets between said pivot posts and coupling said turrets.

* * * * *